E. H. W. WEIBULL.
BALL OR ROLLER CAGE FOR ANTIFRICTION BALL OR ROLLER THRUST BEARINGS.
APPLICATION FILED JULY 1, 1920.
1,415,420. Patented May 9, 1922.
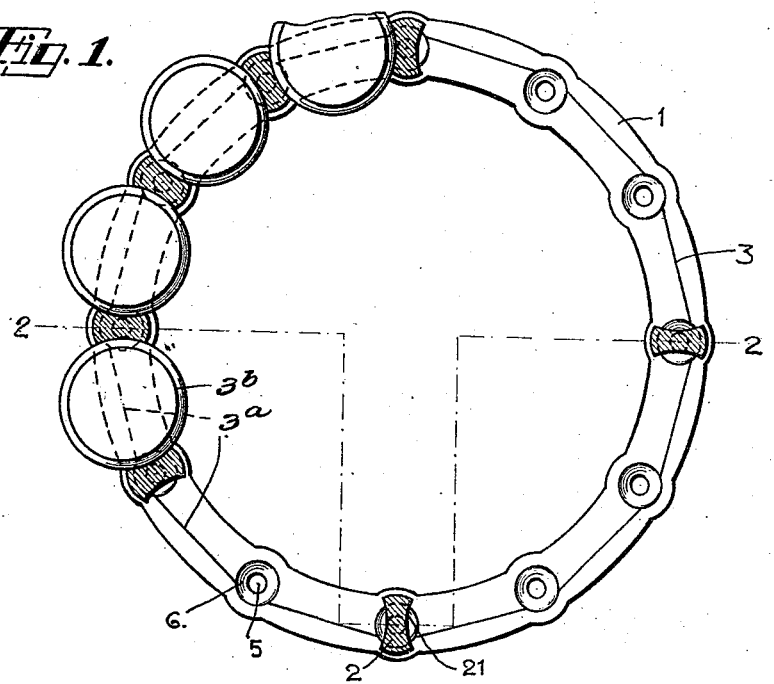
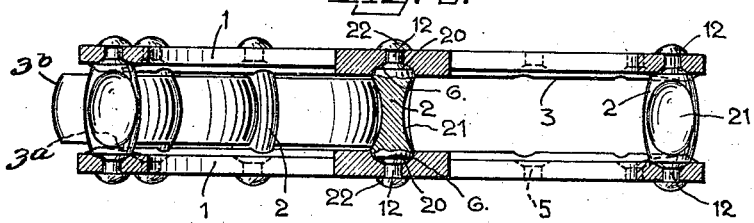
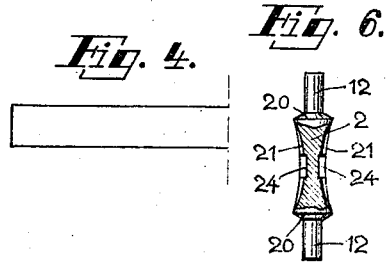 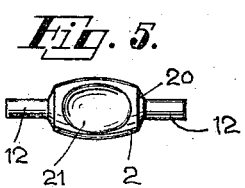
Inventor
E. H. W. Weibull
By H. R. Kerslake
Atty.

UNITED STATES PATENT OFFICE.

ERNST HJALMAR WALODDI WEIBULL, OF GOTTENBORG, SWEDEN, ASSIGNOR TO NORDISKA KULLAGER AKTIEBOLAGET, OF GOTTENBORG, SWEDEN.

BALL OR ROLLER CAGE FOR ANTIFRICTION BALL OR ROLLER THRUST BEARINGS.

1,415,420.  Specification of Letters Patent.  Patented May 9, 1922.

Application filed July 1, 1920. Serial No. 393,396.

*To all whom it may concern:*

Be it known that I, ERNST HJALMAR WALODDI WEIBULL, a subject of the King of Sweden, residing at Gottenborg, Sweden, have invented certain new and useful Improvements in Ball or Roller Cage for Antifriction Ball or Roller Thrust Bearings, of which the following is a specification.

This invention relates to improvements in antifriction ball or roller bearing cages of the type which comprises two side-rings secured to each other by means of cross-pieces that are riveted to the rings.

In such cages, as heretofore known, it has been difficult to join the several parts of the cage firmly together to prevent them from becoming loose by the shocks arising when the bearing is in operation, and the present invention, therefore, has for its primary object to provide a cage of the class mentioned, in which the parts are rigidly connected together.

Another object of the invention is to provide a cage particularly adapted to accomodate a comparatively large number of rolling elements.

A further object is to furnish a cage of simple and inexpensive construction.

With the foregoing objects outlined and with other objects in view, which will appear as the description proceeds, the invention consists in the novel features hereinafter described in detail, illustrated in the accompanying drawing and more particularly pointed out in the appended claims.

Referring to the drawing:

Fig. 1 is an end view partly in section of one of the side-rings of the cage with certain of the cross-pieces shown in section and with a few of the rolling elements between the cross-pieces.

Fig. 2 is a section of the cage taken on the line 2—2 in Fig. 1.

Fig. 3 is a section of a blank from which a side-ring is formed.

Fig. 4 is a side view of a blank from which a cross-piece is formed.

Fig. 5 is a side view of a cross-piece, and

Fig. 6 is a longitudinal section of a somewhat modified embodiment of a cross-piece.

In the drawing 1 denotes the two side-rings, held together by means of cross pieces 2, which are riveted to the two rings 1. The side rings 1 preferably have a rectangular cross-section as shown in Fig. 2.

It is to be observed that the rings 1, according to the embodiment shown in the drawing, are provided with ridges 3, having straight inner edges $3^a$, the rings 1 are intended to be used for roller bearings, in which the rollers consist of discs $3^b$ capable of putting themselves in inclined position in relation to their normal operative position when an axial strain sets up on the bearing. It will be noted that one of the edges $3^a$ extends diametrically across each side of each roller, and that these edges act as fulcrums about which the rollers may swing. The cross pieces 2 are provided with pin-like prolongations 12, which pass through holes 5 in the side-rings 1 and by means of which the pieces 2 are riveted to the rings 1. At the sides facing each other, when the cage is completed, the rings 1 around the holes 5 are provided with cavities 6 of such a shape, as to accommodate the thickened end portions 20 of the cross pieces 2.

The cross pieces 2 serve as partition members between the rolling elements $3^b$. The central portion of each of the pieces 2 is flattened out in the radial direction of the cage, said flattened portion at its two ends merging smoothly into the thickened portions 20. The flattened side-surfaces of the pieces 2 are provided with cavities 21, corresponding to the curved surface of the rolling elements in order to give said elements a good support as may be clearly seen in Fig. 1. Sometimes it is convenient to provide the bottoms of the cavities 21 of the pieces 2 with central recesses 24, so that the rolling elements do not bear against the narrowest portions of the cross pieces. In Fig. 6 there is shown a cross piece with such recesses 24.

The cage herein described has the advantage over cages of similar design hitherto known, in that the cage will be extraordinarily rigid and extremely light in weight. Owing to the present design, the side-rings 1 need not be as thick as was necessary where the cross pieces 2 were of the same thickness, from end to end, as their flattened middle portions because in the present case the cross-pieces 2 project into the side-rings 1 with their conical end portions 20. On the other hand, the cross pieces 2 are flattened in the central portion in order to be rather narrow in the moving direction of the rolling elements for the purpose of enabling these elements to be arranged as close together as possible, thus increasing the supporting power of the bearing, which would not be possible if the cross pieces 2, from end to end, were of a thickness equal only to the narrowest portion of the hole 5. If the strength of the cross pieces 2 in this case should correspond to the strength desired of the whole cage, said pieces must be of a considerably larger diameter than the thickness of the flattened portion according to this invention.

The described cages are manufactured in the following manner:—

By means of a suitable tool, ring shaped blanks of circular cross-section, for instance, as shown in Figure 3, are forged into rings of the shape shown in Figures 1 and 2. The cross pieces 2 may be forged out of blanks of cylindrical shape according to Figure 4, and by means of suitable tools each blank may be brought to the shape wanted, according to Figures 1 and 5, and the end portions 12 and 20 are given the shape, shown in the last mentioned figure. This operation can be performed either as a stamping process, in which the tools operate at right angles to the length axis of the originally cylindrical blank, and press out the superfluous material to the sides through openings in the tools, or as an upsetting process in the length direction of the blank, whereby the blank is compressed into a mould of a shape corresponding to the shape of the cross pieces when completed. Having been manufactured in the manner described, the several parts of the cage are joined together and the outer ends of the projections 12 of the cross pieces are forged down to rivet heads 22.

It is evident that the use of the cage is not limited to antifriction bearings of the special design mentioned above, but the cage also can be used for antifriction bearings provided with rolling elements of some other shape, the ridges 3 on the side-rings then being dispensed with.

What I claim is:—

1. A ball or roller cage for antifriction bearings comprising two side rings each having a series of spaced cavities, a plurality of cross pieces securing said rings to each other, said cross pieces being equally spaced so as to form spacing means for rolling elements, each of said cross-pieces having thickened end portions engaging with the cavities in the rings, and each cross piece having a flattened central portion.

2. A ball or roller cage for antifriction bearings comprising two side rings each having spaced cavities, a plurality of cross-pieces securing said rings together, spacing the rings apart and constituting spacing means for rolling elements, each of said cross-pieces having thickened end portions engaging the cavities in the rings, the central portion of each of said cross-pieces being flattened and curved surfaces arranged between the flattened portion and the ends of the cross-piece, the curved surfaces corresponding to the operative surface of the rolling elements, said flattened portions being provided with recesses located in the radial middle plane of the cage.

3. A cage of the type defined by claim 1 in which the inner sides of said rings are provided with ridges forming side supports for the rolling elements.

4. A rolling element cage for antifriction bearings comprising a plurality of side rings each having a series of equally spaced apertures, each ring having a cavity merging into each of said apertures, cross-pieces having reduced extremities passing through said apertures and thickened end portions resting in said cavities, the central portion of each cross piece being of reduced thickness.

5. A cage of the kind defined by claim 4 in which the opposite sides of each cross piece are provided with cavities having curved surfaces, the curvature of each of said surfaces corresponding to the curvature of the operative faces of rolling elements which are to be used with the cage.

6. A cage of the kind defined by claim 4 in which the rings are provided with inwardly extending ridges having straight inner edges adapted to engage the sides of rolling elements and to permit said rolling elements to rock between the rings.

In testimony whereof I have affixed my signature.

ERNST HJALMAR WALODDI WEIBULL.